United States Patent [19]
Ogawa et al.

[11] Patent Number: 5,014,927
[45] Date of Patent: May 14, 1991

[54] WEBBING RETRACTOR

[75] Inventors: Eiji Ogawa; Osamu Kawai, both of Fujisawa, Japan

[73] Assignee: Nippon Seiko Kabushiki Kaisha, Tokyo, Japan

[21] Appl. No.: 462,960

[22] Filed: Jan. 8, 1990

Related U.S. Application Data

[63] Continuation of Ser. No. 211,580, Jun. 27, 1988, abandoned.

[30] Foreign Application Priority Data

Jun. 30, 1987 [JP] Japan ............................. 62-99327[U]
Jul. 13, 1987 [JP] Japan ........................... 62-107485[U]
Jul. 15, 1987 [JP] Japan ........................... 62-107519[U]

[51] Int. Cl.⁵ .............................................. B60R 22/28
[52] U.S. Cl. ........................... 242/107.40 R; 242/68.5
[58] Field of Search ............... 242/107.4 R, 107.4 A, 242/107.4 B, 107.4 C, 107.4 D, 107.4 E, 68.5, 118.2, 118.11; 280/803, 806–808; 297/470, 471, 472, 476–480

[56] References Cited

U.S. PATENT DOCUMENTS

| | | | |
|---|---|---|---|
| 2,350,369 | 6/1944 | Sampair | 242/68.5 |
| 3,961,761 | 6/1976 | Wiesbock | 242/107.4 A |
| 4,029,267 | 6/1977 | Slipper | 242/107.4 A |
| 4,256,273 | 3/1981 | Burleigh | 242/107.4 R |
| 4,323,205 | 4/1982 | Tsuge et al. | 242/107.4 A |
| 4,453,681 | 6/1984 | Gueguen | 242/107.4 A |

FOREIGN PATENT DOCUMENTS

| | | |
|---|---|---|
| 0002395 | 6/1979 | European Pat. Off. . |
| 0089879 | 9/1983 | European Pat. Off. . |
| 8515327 | 8/1985 | Fed. Rep. of Germany . |
| 2258198 | 8/1975 | France . |
| 2452941 | 10/1980 | France . |
| 2506166 | 11/1982 | France . |
| 2349342 | 11/1987 | France . |
| 58-54138 | 12/1983 | Japan . |
| 61-161055 | 10/1986 | Japan . |
| 1150064 | 4/1969 | United Kingdom . |
| 1324667 | 7/1973 | United Kingdom . |
| 2024607 | 1/1980 | United Kingdom . |
| 2167647 | 6/1986 | United Kingdom . |

Primary Examiner—Katherine Matecki
Attorney, Agent, or Firm—Wegner, Cantor, Mueller & Player

[57] ABSTRACT

When a tensile force of at least a predetermined value is applied to a webbing, a webbing retractor allows the webbing to extend over a length increased beyond that available from mere tightening of the webbing wound on a take-up spindle by the tensile force. The retractor includes a base; the take-up spindle carrying the webbing fastened at one end thereof to the take-up spindle; a lock device for locking rotation of the take-up spindle in a webbing-releasing direction; and a webbing-extension increasing member capable of undergoing a deformation or collapse in a transmission route of the tensile force from the take-up spindle to the base upon application of the tensile force subsequent to locking of the take-up spindle by the lock device.

6 Claims, 10 Drawing Sheets

WEBBING RETRACTOR

This application is a continuation of U.S. application Ser. No. 211,580, filed Jun. 27, 1988, now abandoned.

BACKGROUND OF THE INVENTION

1) Field of the Invention

This invention relates to a webbing retractor for a seat belt system which serves to protect an occupant of a vehicle in the event of an emergency such as collision of the vehicle, and especially to a webbing retractor suitable for use with a lap webbing.

2) Description of the Related Art

Figure 25:
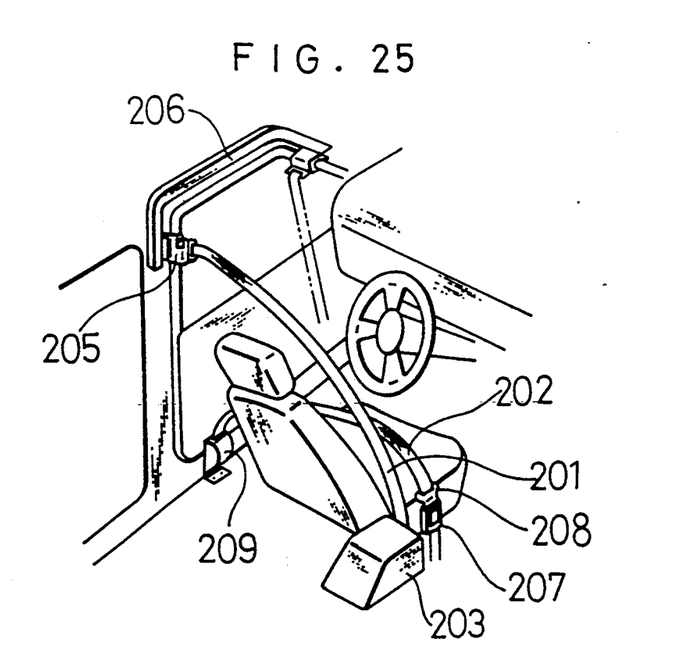
FIG. 25 shows a seat belt system including shoulder webbing and lap webbing installed in a vehicle.

It has conventionally been attempted to control the movements of various parts of an occupant, such as the head and lap, upon collision with a view toward protecting the body of the occupant from an impact of the collision. FIG. 25 illustrates, by way of example, a seat belt system making use of a 2-point electric shoulder webbing and a lap webbing in combination. The seat belt system is suitable as a 3-point seat belt system to which the present invention is applied. A shoulder webbing 201 is taken up from one end thereof by an emergency locking retractor 203 mounted inboard a seat of a vehicle, whereas the other end of the shoulder webbing 201 is fastened to a movable anchor 205. The movable anchor 205 is guided by a guide rail 206 provided along a roof side of a vehicle body, so that the movable anchor 205 is caused to move forward or rearward along the length of the vehicle by an electric drive means (not illustrated) when an associated door of the vehicle is opened or closed.

In addition, one end of a lap webbing 202 is fastened to a tongue 208 which is releasably latched in a buckle 207 also mounted inboard the seat. The lap webbing 202 is taken up from the other end thereof into an emergency locking or automatic locking retractor 209 provided on a side sill. It has generally be known that in a dynamic test of such a seat belt system, the forward tilting of the upper torso of an occupant is delayed, the degree of movement of his head is reduced and better influence is therefore given to the severity of injury as the extendable lap webbing length (the possible increment of the restraining length of the lap webbing) by elongation of the lap webbing and tightening of windings of the lap webbing increases.

As a method for increasing the extendable webbing length of a seat belt system, it has heretofore been practised to make the elongation of the webbing itself greater so as to increase the outward extendability of the webbing or to provide a fuse, namely, to fold back and sew a portion of the webbing so that the stitches may be successively broken off upon application of an impact.

It has also been practised to leave more windings of a lap webbing on a webbing take-up spindle even after the lap webbing has been worn, so that the lap webbing would be allowed to extend longer owing to greater tightening of the windings of the lap webbing upon application of an impact.

It is however by no means possible to obtain any sufficient extended webbing length by simply increasing the elongation of a webbing itself. The provision of a fuse is also accompanied by such drawbacks that the manufacturing cost becomes high due to the need for a longer webbing and the external appearance is poor due to the exposure of the folded fuse to the outside. The method of leaving more windings of a webbing to achieve greater tightening of the windings requires a much longer webbing, leading to a problem that an increased manufacturing cost is unavoidable.

SUMMARY OF THE INVENTION

An object of this invention is therefore to provide a webbing retractor which is free of the above-described drawbacks and allows a webbing to extend longer in the event of an emergency.

In one aspect of this invention, there is thus provided a webbing retractor comprising:
- a base;
- a take-up spindle means supported rotatably on the base and carrying a webbing fastened at one end thereof to the take-up spindle means;
- a lock means for locking rotation of the take-up spindle means in a webbing-releasing direction; and
- a webbing-extension increasing means capable of undergoing a deformation or collapse in a transmission route of a tensile force of at least a predetermined value, which is applied to the webbing, from the take-up spindle means to the base upon application of the tensile force subsequent to locking of the take-up spindle means by the lock means, whereby the webbing is allowed to extend over a length increased beyond that available from mere tightening of the webbing wound on the take-up spindle means by the tensile force.

Owing to the provision of the webbing-extension increasing means, the webbing is allowed to extend sufficiently without failure at the time of emergency locking. The webbing retractor may be manufactured without substantial increase in manufacturing cost, because it does not require a longer webbing. Its external appearance is by no means inferior to conventional webbing retractors, since its webbing does not include any fuse, namely, folded portion.

BRIEF DESCRIPTION OF THE DRAWINGS

The above and other objects, features and advantages of the present invention will become apparent from the following description and the appended claims, taken in conjunction with the accompanying drawings, in which:

FIGS. 6A through 16A are fragmentary front views of webbing retractors according to fifth to fifteenth embodiments of this invention;

FIGS. 6B through 16B are side views depicting fragmentary cross-sectional shapes of the webbing retractors according to the fifth to fifteenth embodiments of this invention;

DETAILED DESCRIPTION OF THE INVENTION AND PREFERRED EMBODIMENTS

The webbing retractor according to the first embodiment of this invention will be described with reference to FIG. 1. The retractor may preferably be secured on an outboard side of a vehicle body relative to a seat so as to take up a lap webbing in a passive or active seat belt system equipped with a shoulder webbing and the lap webbing.

Figure 1:
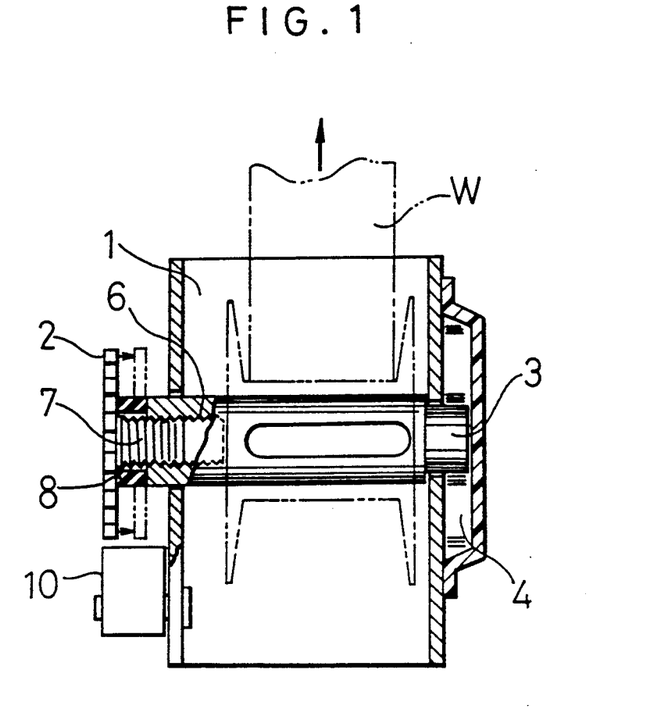
FIG. 1 is a partly cut-away front view of a webbing retractor according to a first embodiment of this invention.

In FIG. 1, a webbing take-up spindle means constructed of a latch plate 2 and a spindle 3 is supported rotatably on a base 1. The take-up spindle means is normally biased in a webbing-winding direction by a take-up spring 4. An inner end of a webbing W is fastened on the spindle 3.

The spindle 3 and latch plate 2 respectively have an internally-threaded portion 6 and an externally-threaded portion 7, which are screwed together. An elastic member 8 such as a spring, rubber member or resin member is fixedly interposed between an end portion of the spindle 3 and an inner peripheral wall of the latch plate 2, whereby the engagement between the internally-threaded portion 6 and externally-threaded portion 7 is maintained in a steady state and the spindle 3 and latch plate 2 are normally maintained as unitary members.

A latch piece 10 which serves as a part of an emergency locking means is provided swingably on the base 1. The emergency locking means detects an emergency state (such as a sudden acceleration or deceleration of a vehicle body) by an action of an unillustrated additional member and then causes the latch piece 10 to swing to a position where the latch piece 10 is engageable with one of external teeth of the latch plate 2.

When the latch piece 10 is brought into engagement with the latch plate 2 in the event of an emergency, the latch plate 2 and spindle 3 which have rotated together in a webbing-releasing direction are locked first of all. Since a tensile force of at least a predetermined value is eventually applied to the webbing W, the elastic member 8 begins to undergo a deformation or collapse and at the same time, the spindle 3 starts rotating relative to the latch plate 2 which is prevented from rotation by the latch piece 10. Here, the externally-threaded portion 7 is screwed into the internally-threaded portion 6 and after the portion 7 has turned over a predetermined angle, the spindle 3 is again rendered integral with the latch plate 2 so that the relative rotation of the spindle 3 is stopped.

Figure 2:
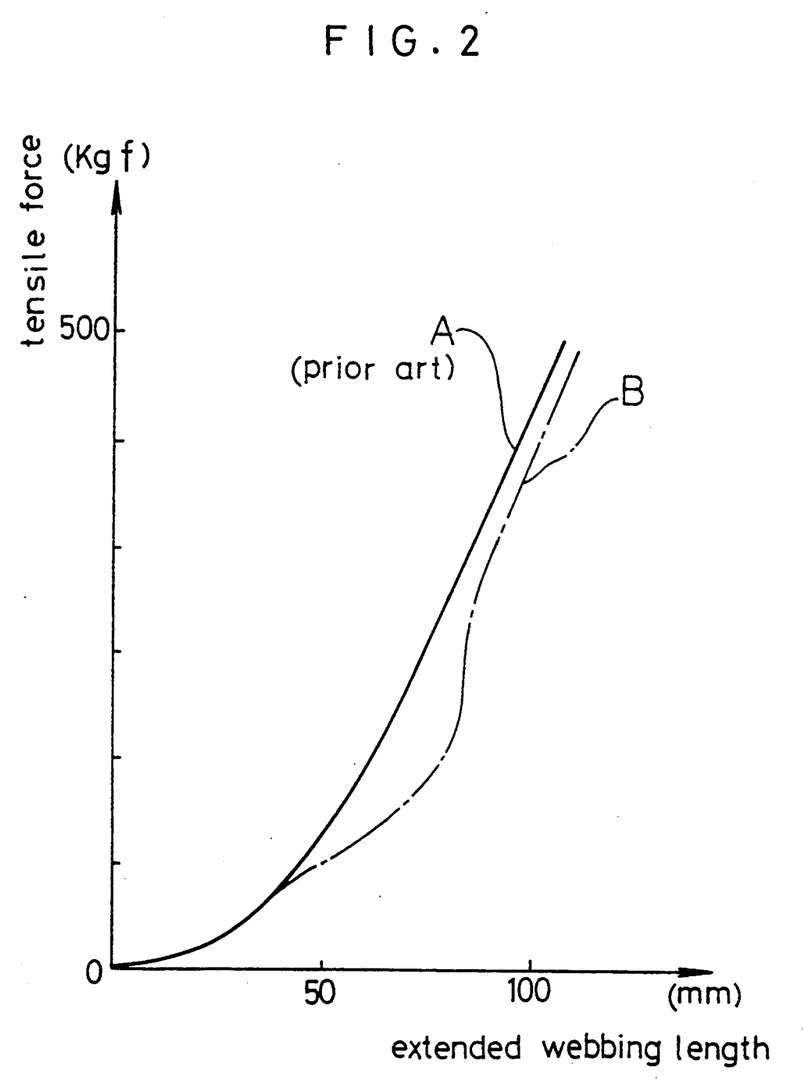
FIG. 2 is a graph showing the relationship between extended webbing lengths and their corresponding tensile forces to the webbing.

The manner of extension of the webbing W at the above time is shown in FIG. 2. When the tensile force applied to the webbing W reaches about 100 kgf for example, relative rotation of the spindle 3 takes place as described above so that the extended webbing length begins to exceed that available from simple tightening of windings of the webbing W. Accordingly, the extended webbing length starts increasing as indicated by an alternate long and short dash line B instead of a solid line A which indicates extended webbing lengths caused only by conventional simple tightening of windings of the webbing. Since the relative rotation stops eventually, the extended webbing length increases only by simple tightening of the windings of the webbing W again so that the line B extends substantially along the line A. Anyhow, the extendable webbing length has bee increased.

In the above embodiment, the relative rotation between the spindle 3 and latch plate 2 may be stopped by a knock pin (whose breaking load has been set suitably) or the like in place of the elastic member 8.

The webbing retractor according to the second embodiment will next be described.

Figure 3:
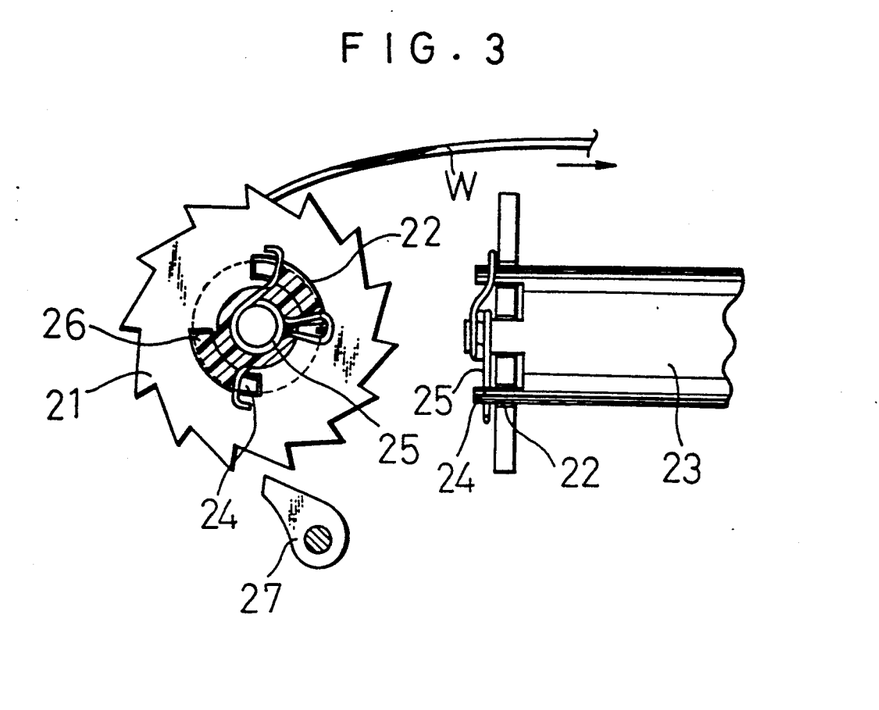
FIG. 3 contains fragmentary side and front views of a webbing retractor according to a second embodiment of this invention.

In FIG. 3, a pair of arcuate slots 22 are formed through a latch plate 21. Projections 24, which extend out in a pair from one end of a spindle 23, are fit snugly within the corresponding slots 22. The projections 24 are normally fixed at one ends of their corresponding slots 22 by a spring 25 or by resin or like pieces 26 which fill up the remaining spaces of the slots 22. Accordingly, the spindle 23 and latch plate 21 are normally maintained as unitary members. When a tensile force of at least a predetermined value is however applied to the spindle 23 from the webbing W subsequent to locking of the latch plate 21 by a latch piece 27, the spring 25 begins to undergo a deformation or the resin pieces 26 starts undergoing a collapse. As a result, the spindle 23 begins to rotate relative to the latch plate 21.

Advantages of the second embodiment are substantially the same as those of the first embodiment.

Figure 4:
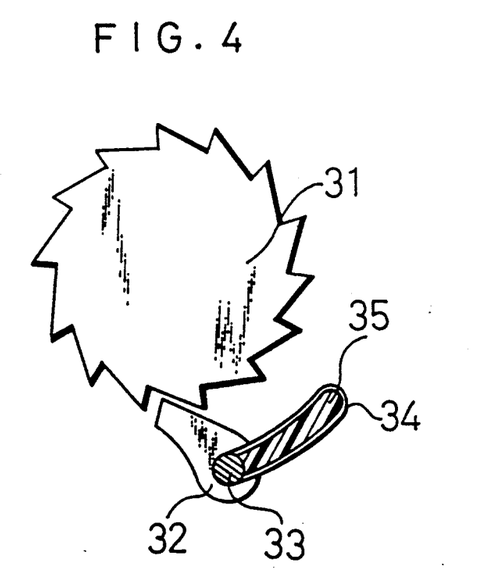
FIG. 4 is a fragmentary front view of a webbing retractor according to a third embodiment of this invention.

The webbing retractor according to the third embodiment will next be described with reference to FIG. 4. A take-up spindle means is constructed of a spindle (not shown) and a latch plate 31, which are always completely integral to each other. A support pin 33, on which a latch piece 32 is mounted pivotally, is received within an arcuate slot 34 bored through the base 1. The support pin 33 is normally supported by the lower edge of the arcuate slot 34 as viewed in FIG. 4. A resin or like piece 35 is filled in the remaining space of the slot 34 so as to fix the support pin 33.

When a tensile force of at least a predetermined value is applied to the latch piece 32 from the webbing W (see FIG. 3) via the latch plate 31 in the event of an emergency, a force is applied from the support pin 33 to the resin or like piece 35 so that the resin or like piece 35 beings to undergo a collapse or deformation. The support pin 33 therefore starts moving along the slot 34, whereby the latch plate 31 is allowed to rotate over a predetermined angle in a webbing-releasing direction while being maintained in engagement with the latch piece 32.

Advantages of the third embodiment are substantially the same as those of the first embodiment.

In the third embodiment described above, the resin or like piece 35 may be omitted provided that the slot 34 is formed in a rosary-like shape in which slot portions having a width substantially the same as the diameter of the support pin 33 and slot portions having a width slightly narrower than the diameter of the support pin 33 are continuously alternated.

Next, the webbing retractor according to the fourth embodiment of this invention will be described with reference to FIG. 5.

A latch piece 41 is the same as that in the third embodiment. First, second and third teeth 43,44, 45 are formed in a latch piece 42. The teeth 43,44 other than the third tooth 45 are designed to break or deform by a low load.

Figure 5:
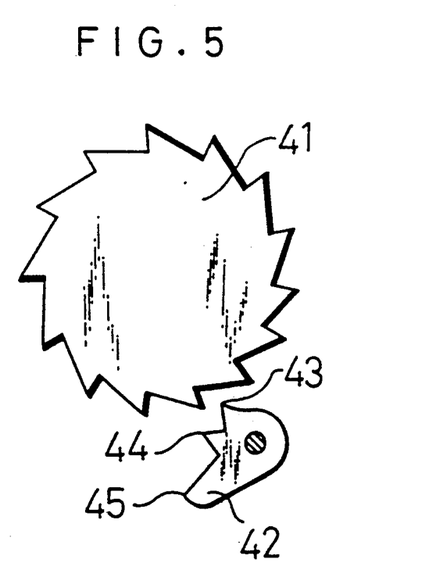
FIG. 5 is a fragmentary front view of a webbing retractor according to a fourth embodiment of this invention.

When a load of at least a predetermined value is applied in the event of an emergency, the first tooth 43 which has been in engagement with one of external teeth of the latch plate 41 is broken and at the same time, the latch plate 41 and latch piece 42 rotate slightly in the counter-clockwise direction and clockwise direction respectively as viewed in FIG. 5 so that the next outer tooth and the second tooth 44 engage each other. Then, the second tooth 44 is also broken and the third tooth 45 eventually engages the next outer tooth. As a result, the rotation of the latch plate 41 in the webbing-releasing direction is stopped.

Advantages of the fourth embodiment are the same as those of the foregoing embodiments.

A description will next be made of webbing retractors in each of which a bobbin with a webbing wound thereon is deformed to increase the extendable webbing length.

In FIGS. 6A through 10A and FIGS. 6B through 10B, the webbings W are wound on cylindrical portions of their corresponding bobbins 51,61,71,81,91 mounted rotatably on unillustrated bases respectively. The webbings W are each biased in a webbing-winding direction by an unillustrated biasing means. Between the bobbins 51,61,71,81,91 and innermost windings of their corresponding webbings W, ribs 53,63,73,93 and spacers 84 capable of undergoing a plastic deformation under a load of at least a predetermined value are provided as unitary members on their corresponding bobbins 51,61,71,81,91, whereby at least a portion of an innermost winding of the webbing wound on each bobbin is maintained out of contact with the drum of the bobbin and a space is therefore formed therebetween. Each of the ribs 53, 63, 73, and 93 contacts the innermost windings of the corresponding webbings independently.

Figure 6A:
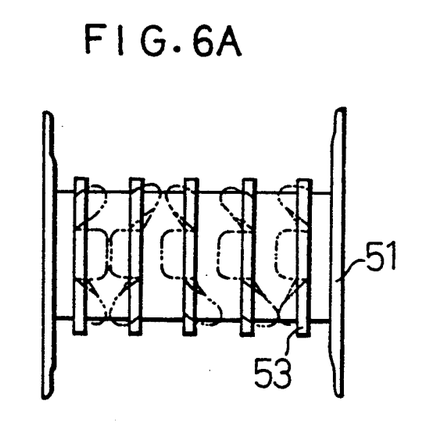
Figure 6B:
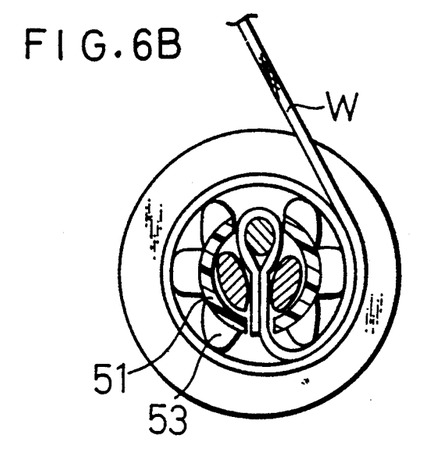
Figure 7A:
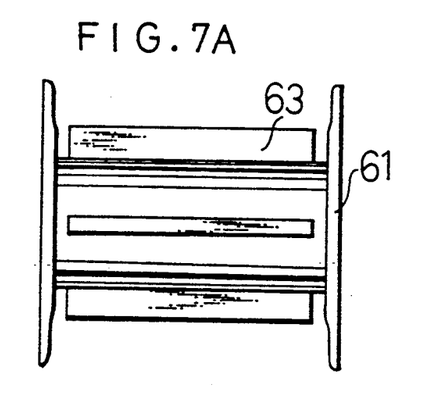
Figure 7B:
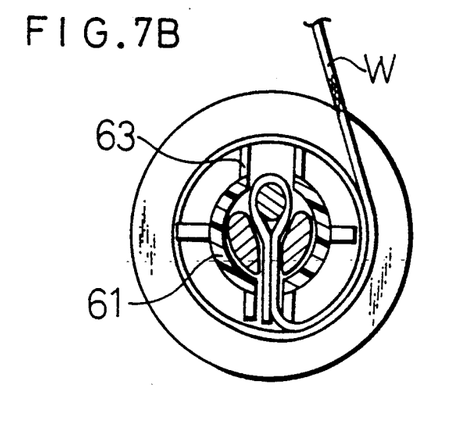
Figure 8A:
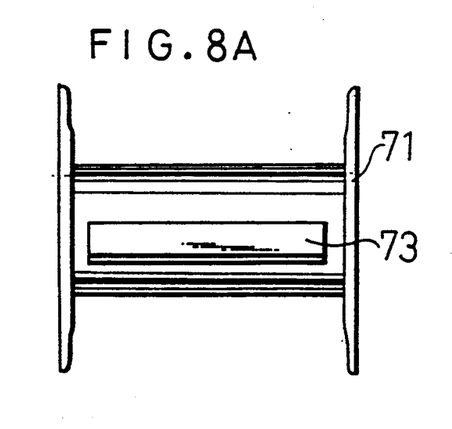
Figure 8B:
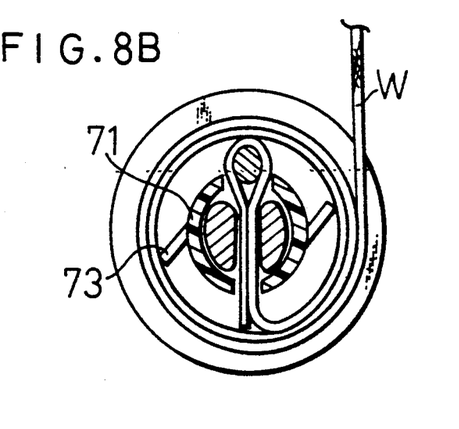
Figure 9A:
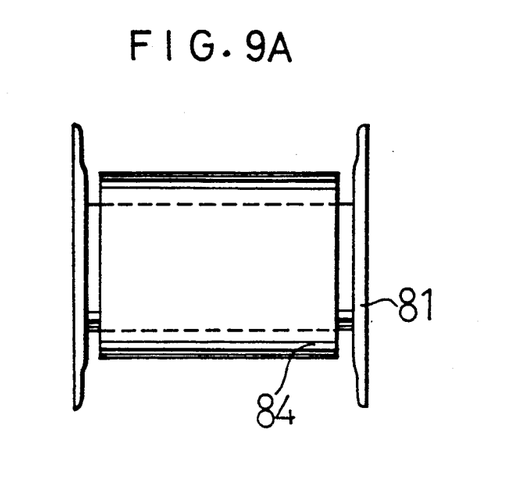
Figure 9B:
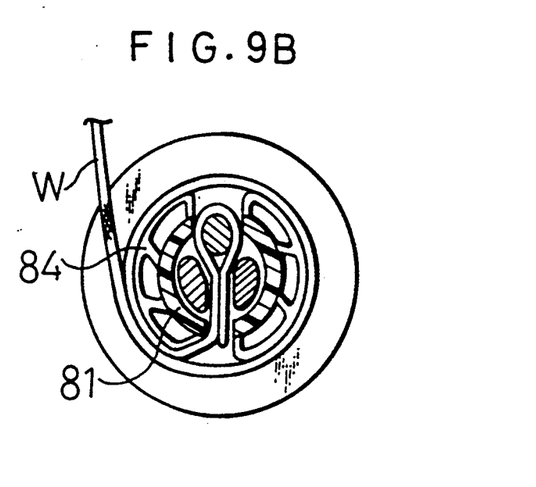
Figure 10A:
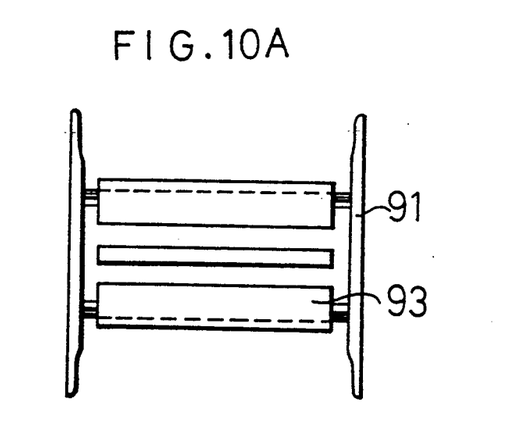
Figure 10B:
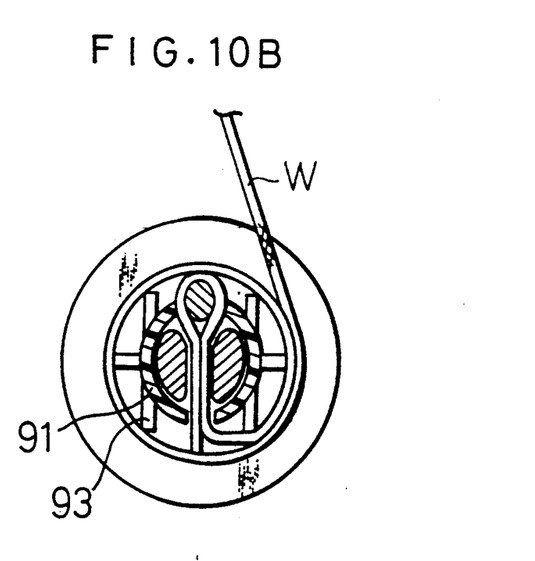
Figure 11A:
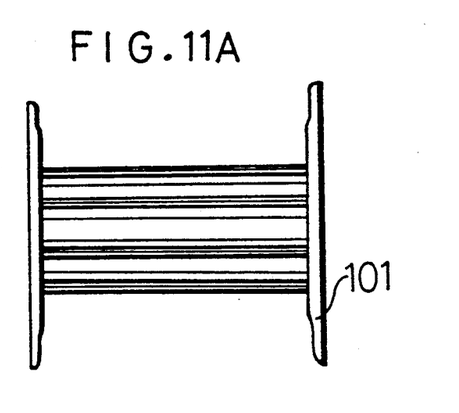
Figure 11B:
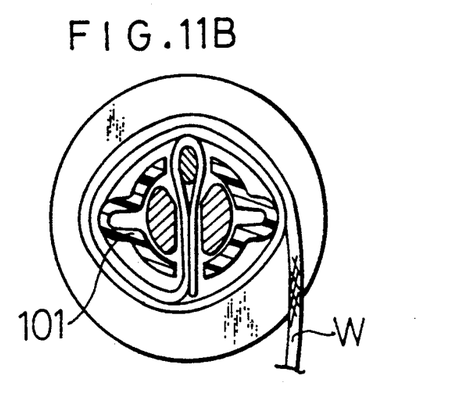
Figure 12A:
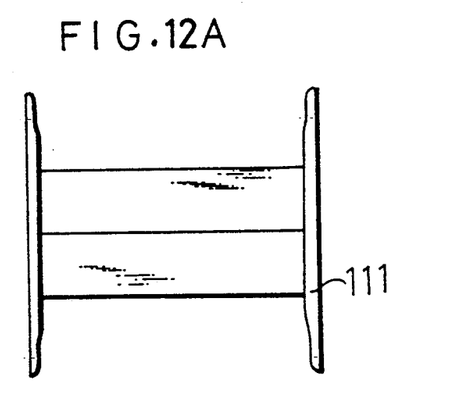
Figure 12B:
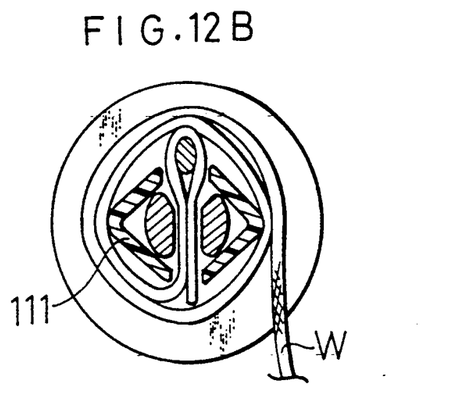
Figure 13A:
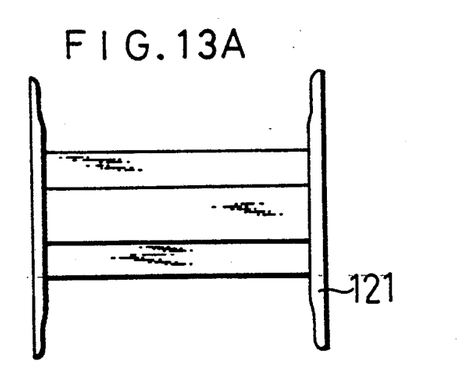
Figure 13B:
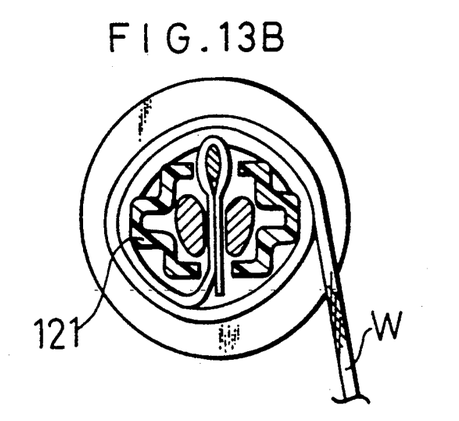
Figure 14A:
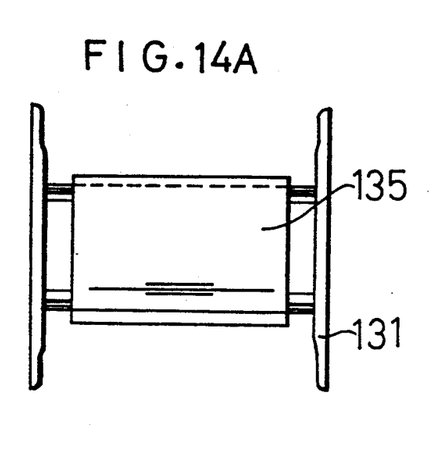
Figure 14B:
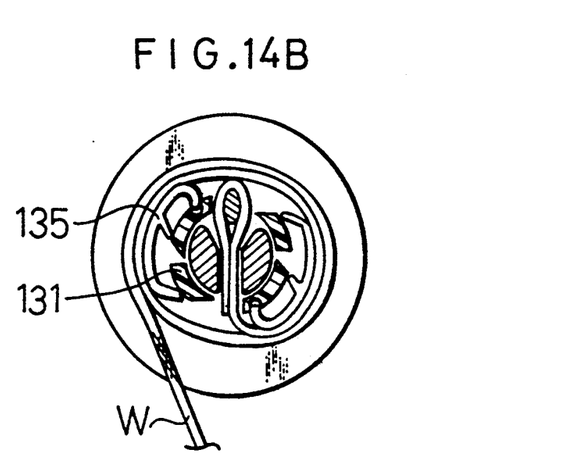

As can be seen in FIGS. 6A and 6B, a plurality of ribs 53 are formed at angular intervals around the outer circumference of bobbin 51, and are also spaced in the axial direction of the bobbin. In FIGS. 7A-7B, 8A-8B, and 10A-10B, on the other hand, the ribs 63, 73, 93 are located at angular intervals around the outer circumference of their respective bobbins, but extend in the axial direction. As can be seen in FIG. 8B, the ribs 73 of that embodiment are angled from the bobbin 71 in a direction of release of the webbing W. In all FIGS. 6A-B, 7A-B, 8A-B, and 10A-B, the ribs are attached to the drum in a cantilevered fashion.

When rotations of the bobbins (webbing take-up spindles) 51,61,71,81,91 are stopped in the event of an emergency such as a vehicle collision, tensile forces applied to the webbings W are transmitted to attachment portions of the webbings W to the bobbins 51-91 and are borne by unillustrated bases finally. In the courses of transmission of the tensile forces, the ribs 53,63, 73,93 and spacers 84 are provided with the above-described spaces formed as sufficient collapse-permitting spaces. When a force of at least a predetermined value is transmitted, they can undergo a plastic deformation without any problem. When a plastically-deformable material, for example, a metal such as an iron sheet or a resin such as a plastic is used to form the ribs 53,63,73,93 and spacers 84 and the thicknesses and shapes of the ribs 53,63,73,93 and spacers 84 are suitably selected and combined, the windings of the webbings W are tightened so that predetermined extendable webbing lengths can be given rather easily to the webbings W respectively.

The webbing retractors according to the tenth to twelfth embodiments will next be described with reference to FIGS. 11A through 13A and FIGS. 11B through 13B.

Their differences from the embodiments of the fifth to ninth embodiments reside in that the shapes of bobbins 101,111,121 are not circular cylindrical, the bobbins 101,111,121 are deformable by themselves, and no separate members such as ribs 53,63,73,93 or spacers 84 are added. Since the ribs 53,63,73,93 or spacers 84 can be omitted in the tenth to twelfth embodiments, the numbers of parts and assembly steps can be reduced and the accuracy control of a buckling load upon tightening of windings of a webbing can be facilitated.

The webbing retractors according to the thirteenth and fifteenth embodiments will next be described with reference to FIGS. 14A and 16A and FIGS. 14B and 16B.

The thirteenth and fifteenth embodiments are different from the eighth embodiment in that the spacers 135,155 are not formed as integral members with their corresponding bobbins 131,151 but are attached as discrete members on the corresponding bobbins 131,151. Since different materials can be used for the spacers 135,155 and the bobbins 131,151 in these embodiments, greater designing freedom may be enjoyed upon selection of a material for the spacers 135,155.

Figure 15A:
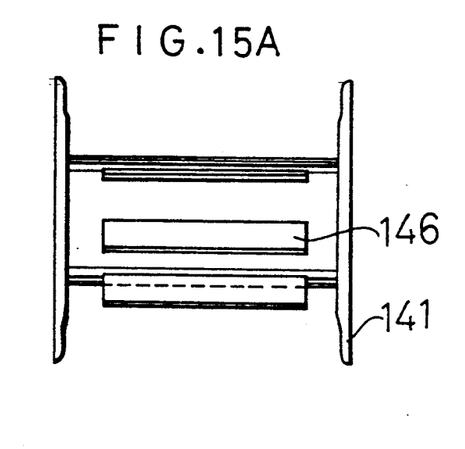
Figure 15B:
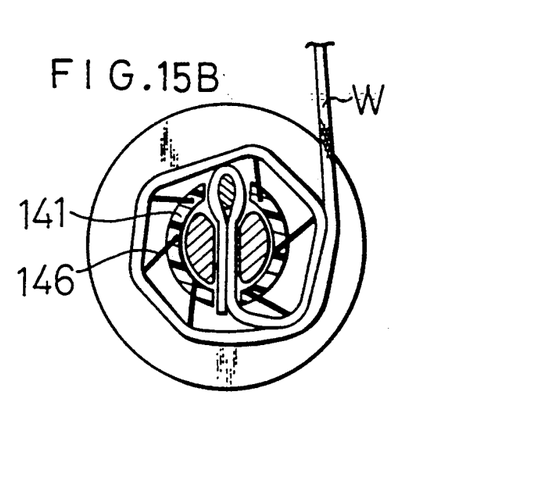
Figure 16A:
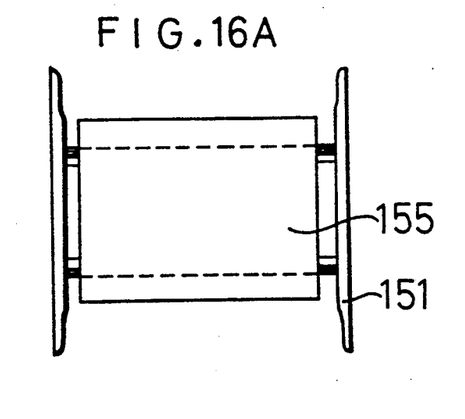
Figure 16B:
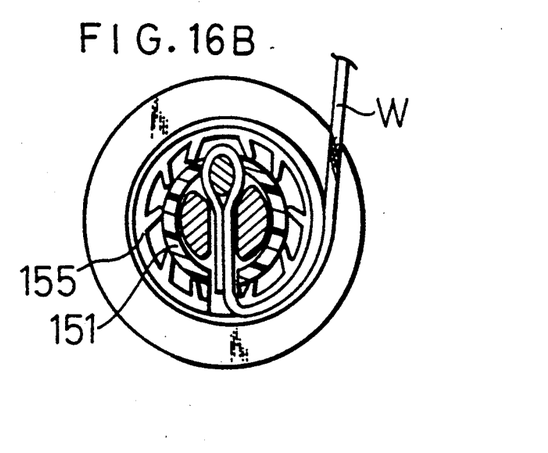

The webbing retractor according to the fourteenth embodiment will also be described with reference to FIGS. 15A and 15B.

The fourteenth embodiment is different from the fifth to ninth embodiments in that elastic members 146 formed of rubber plates, leaf springs or the like are employed in lieu of the ribs 53,63,73,93 or spacers 84. The adoption of the elastic members 146 as in the fourteenth embodiment permits continuous use of the webbing retractor even after an emergency, because at the time of the emergency, rotation of the bobbin 141 is stopped and the elastic members 146 are hence deformed but the elastic members 146 can thereafter restore their original shape.

A description will next be made of embodiments in each of which the spacings between adjacent windings of a webbing are reduced to increase the extendable webbing length.

Figure 17:
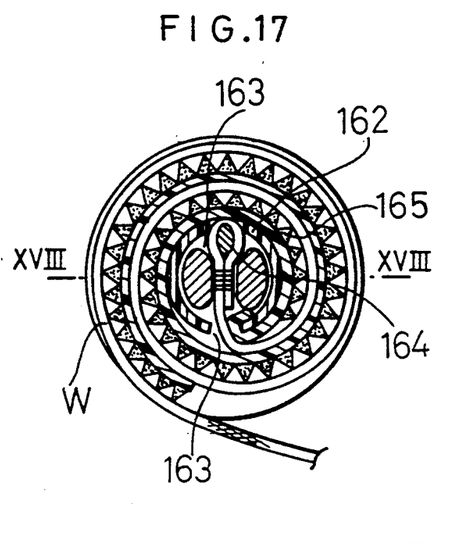
FIG. 17 is a fragmentary cross-sectional view of a webbing retractor according to a sixteenth embodiment of this invention, taken along a plane perpendicular to an axial direction.
Figure 18:
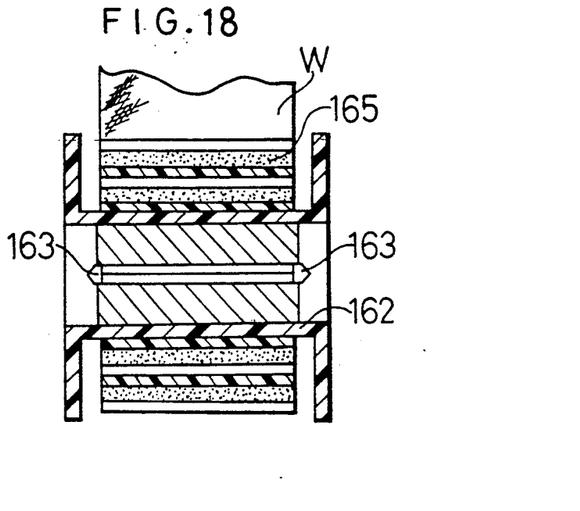
FIG. 18 is a cross-sectional view taken along line XVIII—XVIII of FIG. 17.
Figure 19:
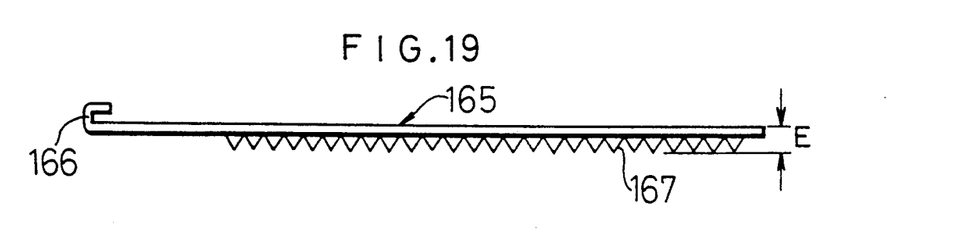
FIG. 19 is a side view of a webbing-extending device taken out of the webbing retractor according to the sixteenth embodiment of this invention.

The webbing retractor according to the sixteenth embodiment is now described with reference to FIGS. 17 through 19. A webbing-extending member 165 made of a plastic or the like and containing spaces in the form of a layer is interposed continuously between adjacent windings of the webbing W wound on a bobbin 162. The webbing-extending member 165 is in the form of a belt and is formed into a hook 161 at one end thereof. The hook 166 is in engagement with a trailing edge of a through-slot 163 of the bobbin 162 as viewed in a webbing-winding direction, so that the webbing-extending member 165 is wound together with the webbing W. Incidentally, numeral 164 indicates a pin for preventing the webbing W from slipping out. The adjacent windings of the webbing W are normally spaced from each other by the thickness E of the webbing-extending member 165. The webbing-extending member 165 has a number of ridges 167, which are arranged with intervals so as to define the spaces in the form of a layer. When a tensile force of at least a predetermined value is applied to the webbing W, the ridges 167 are deformed and collapsed. As a result, the spacings between the adjacent windings of the webbing W are reduced, the diameter of the webbing W wound on the bobbin 162 is reduced, and the extendable length of the webbing W is hence increased. The webbing-extending member 165 containing the spaces in the form of a layer may not necessarily be limited to a structure resembling a washboard or corrugated board as illustrated in the drawings. Various embodiments may be contemplated of, including those having rugged or embossed surfaces such as shock-absorbing materials employed for packing.

Figure 20:
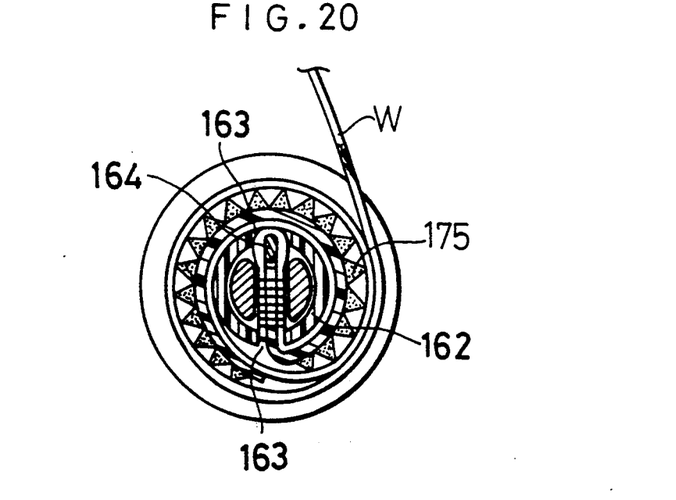
FIG. 20 is a fragmentary cross-sectional view of a webbing retractor according to a seventeenth embodiment of this invention, taken along a plane perpendicular to an axial direction.
Figure 21:
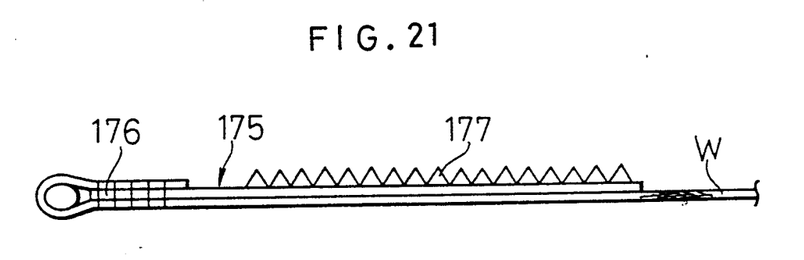
FIG. 21 is a side view of a webbing-extending device taken out of the webbing retractor according to the seventeenth embodiment of this invention.

The webbing retractor according to the seventeenth embodiment will next be described. In this embodiment, an end portion 176 of the webbing-extending member 175 having a number of ridges 177 is attached as a unitary member to an end portion of the webbing W wound on the bobbin 162. This construction permits the omission of a step for securing the webbing-extending member 175 on a bobbin by a hook or the like, whereby the assembly of the webbing retractor is simplified.

Figure 22:
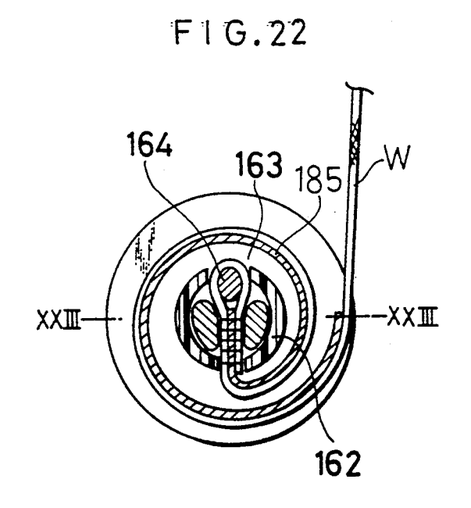
FIG. 22 is a fragmentary cross-sectional view of a webbing retractor according to an eighteenth embodiment of this invention, taken along a plane perpendicular to an axial direction.
Figure 23:
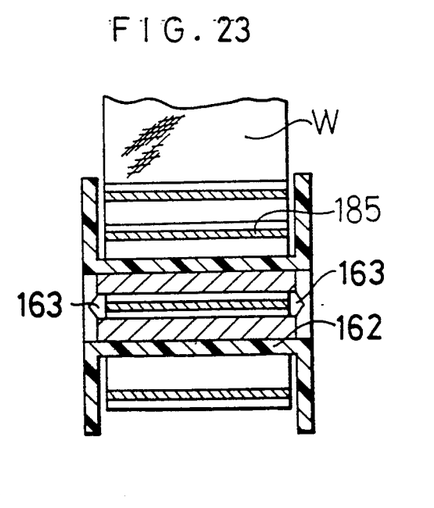
FIG. 23 is a cross-sectional view taken along line XXIII—XXIII of FIG. 22.

The webbing retractor according to the eighteenth embodiment of this will next be described with reference to FIGS. 22 and 23. An elastic member 185 such as a leaf spring is sewed on an end portion of the webbing W wound on the bobbin 162. Owing to the restoring force of the elastic member 185 against bending, the webbing W has a self-standing property and spacings are normally left between adjacent windings of the webbing W wound on the bobbin 162. When a tensile force of at least a predetermined value is applied to the webbing W due to an impact or the like, the elastic member 185 is flexed so that the spacings between the adjacent windings of the webbing W are reduced or eliminated. As a result, the webbing W is allowed to extend out over a length increased accordingly.

Owing to the adoption of the elastic member 185, the webbing retractor according to the eighteenth embodiment can be continuously used even after an emergency or the like.

Figure 24:
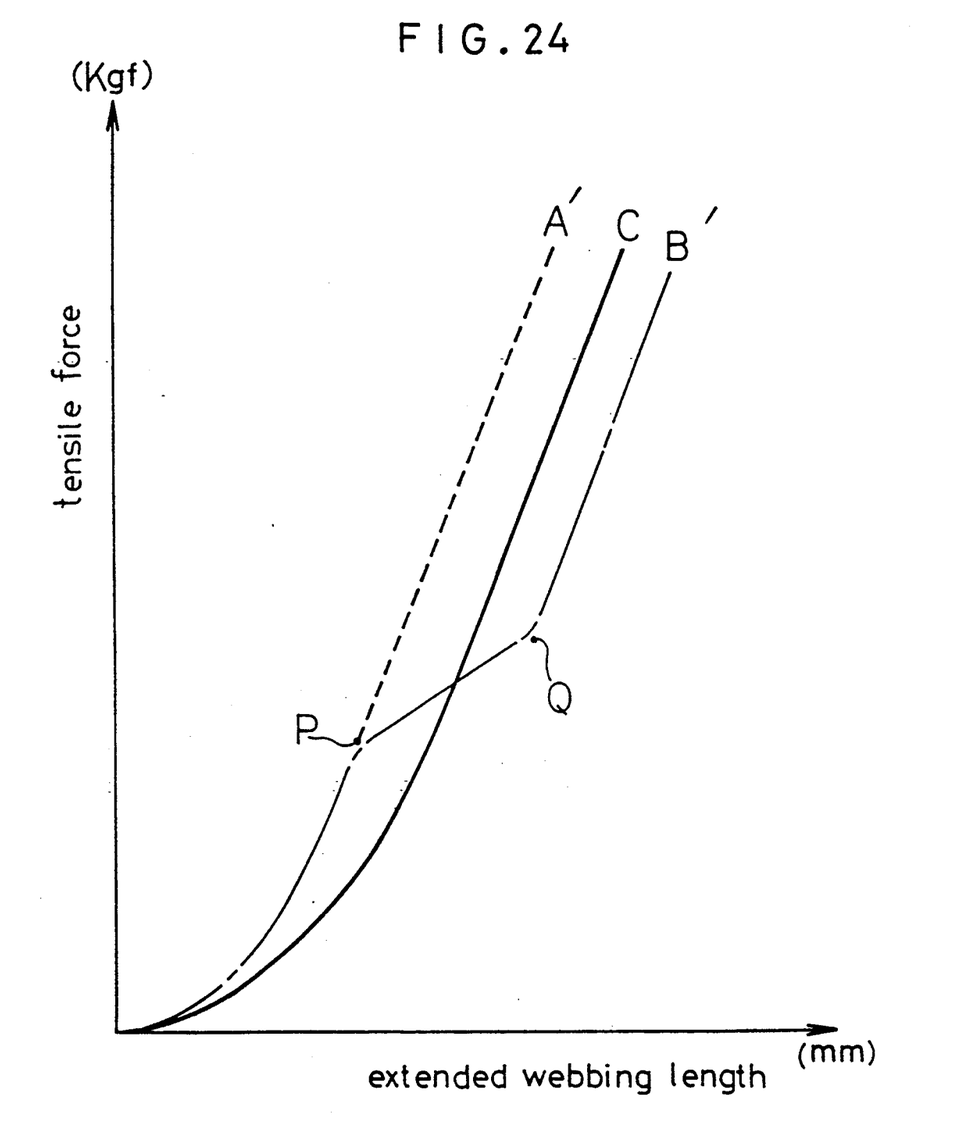
FIG. 24 is a diagram showing the relationship between extended webbing lengths and their corresponding tensile forces to the webbing.

Finally, with reference to FIG. 24, a description will be made of the relationship between tensile forces applied to the webbing W and their corresponding extended webbing lengths in the construction of each embodiment of this invention. In the diagram, letter A' indicates a conventional example in which the extendable webbing length has not been set long, letter C corresponds to another conventional example in which the extendable webbing length has been increased, for example, by leaving more windings of a webbing on a bobbin when the webbing is worn by an occupant, and letter B' indicates a curve for the embodiment of this invention.

When it is started to apply a tensile force to the webbings, all the three retractors have substantially the same extended webbing length in the beginning. The conventional retractor A' and the invention retractor B' thereafter have a suitably shorter extended webbing length over a certain tensile force range, thereby exhibiting characteristics excellent in the initial restraining of an occupant. On the other hand, the webbing is inherently caused to extend longer beyond necessity in the conventional retractor C, thereby indicating that the initial restraint would be somewhat insufficient.

When point P corresponding to a predetermined tensile force is reached, the deformable members or elastic members undergo a deformation in the invention retractor B' so that the webbing begins to extend longer than that available from the simple elongation or extension. In contrast, the webbing of the conventional retractor A' can undergo only its insufficient inherent extension up to the maximum tensile force applied in the test.

In the case of the invention retractor B', the extendable webbing length returns to the inherently extendable webbing length upon completion of the deformation of the deformable members or elastic members at point Q. Thereafter, the webbings of the three retractors are all allowed to extend to their inherent extendable lengths respectively.

The webbing retractor of this invention retains an extendable webbing length featuring good initial restraint for an occupant up to point P, assures a greater extendable webbing length from point P to point Q and gives an inherent extendable webbing length after point Q. It is hence indicated that the webbing retractor of this invention allows its webbing to extend over a necessary and sufficiently-long length in the event of an emergency.

Having now fully described the invention, it will be apparent to one of ordinary skill in the art that many changes and modifications can be made thereto without departing from the spirit or scope of the invention as set forth herein.

We claim:

1. A webbing retractor, comprising:
   a base;
   a bobbin supported rotatably on the base and having a drum on which a webbing is wound;
   webbing-extension increasing means provided between the drum of the bobbin and an innermost winding of the webbing wound on the drum for allowing the webbing to extend over an increased length when a tensile force of at least a predetermined value is applied to the webbing, said webbing-extension increasing means comprising a plurality of cantilevered ribs provided at axial intervals along said drum and extending circumferentially about at least a part of the outer circumference of said drum, each of said cantilevered ribs being in independent contact with the innermost winding of the webbing, wherein said cantilevered ribs deform upon application of the tensile force of at least the predetermined value.

2. The webbing retractor as claimed in claim 1, wherein the ribs are formed integrally with the drum of said bobbin.

3. The webbing retractor as claimed in claim 2, wherein each said cantilevered rib is divided into a plurality of angularly-projecting portions.

4. A webbing retractor, comprising:
a base;
a bobbin supported rotatably on the base and having a drum on which a webbing is wound;
webbing-extension increasing means provided between the drum of the bobbin and an innermost winding of the webbing wound on the drum for allowing the webbing to extend over an increased length when a tensile force of at least a predetermined value is applied to the webbing, said webbing-extension increasing means comprising a plurality of cantilevered ribs provided at angular intervals about the outer circumference of said drum and extending axially along said drum, each of said cantilevered ribs being in independent contact with the innermost winding of the webbing, wherein said cantilevered ribs deform upon application of the tensile force of at least the predetermined value.

5. The webbing retractor as claimed in claim 4, wherein the ribs are formed integrally with the drum of said bobbin.

6. The webbing retractor as claimed in clam 5, wherein the ribs are tilted from the drum in a webbing-releasing direction.

* * * * *